(12) United States Patent
Hsu (10) Patent No.: US 11,630,604 B2
(45) Date of Patent: Apr. 18, 2023

(54) METHODS FOR CONTROLLING DATA STORAGE DEVICE, AND ASSOCIATED FLASH MEMORY CONTROLLER

(71) Applicant: SILICON MOTION INC., Zhubei (TW)

(72) Inventor: Hong-Jung Hsu, Zhubei (TW)

(73) Assignee: SILICON MOTION INC., Zhubei (TW)

( * ) Notice: Subject to any disclaimer, the term of this patent is extended or adjusted under 35 U.S.C. 154(b) by 0 days.

(21) Appl. No.: 17/489,088

(22) Filed: Sep. 29, 2021

(65) Prior Publication Data

US 2022/0137874 A1     May 5, 2022

Related U.S. Application Data

(60) Provisional application No. 63/107,420, filed on Oct. 29, 2020.

(51) Int. Cl.
    *G06F 3/06*              (2006.01)

(52) U.S. Cl.
    CPC .......... *G06F 3/0656* (2013.01); *G06F 3/0619* (2013.01); *G06F 3/0634* (2013.01); *G06F 3/0659* (2013.01); *G06F 3/0679* (2013.01)

(58) Field of Classification Search
    CPC .... G06F 3/0656; G06F 3/0619; G06F 3/0634; G06F 3/0659; G06F 3/0679
    See application file for complete search history.

(56) References Cited

U.S. PATENT DOCUMENTS

| | | |
|---|---|---|
| 2009/0164704 A1 | 6/2009 | Kanade |
| 2013/0060990 A1 | 3/2013 | Yeh |
| 2015/0236716 A1* | 8/2015 | Fukuda ................. G06F 11/073 714/768 |
| 2015/0355965 A1 | 12/2015 | Peddle |
| 2018/0018101 A1* | 1/2018 | Benisty ................. G06F 3/0659 |
| 2018/0039578 A1 | 2/2018 | Yun |
| 2019/0179567 A1* | 6/2019 | Kanno ................. G06F 3/0679 |
| 2020/0133512 A1* | 4/2020 | Hodes ................... G06F 3/0616 |
| 2020/0151040 A1 | 5/2020 | Lee |

OTHER PUBLICATIONS

International Search Report and Written Opinion in International Patent Application No. PCT/CN2021/121572, dated Dec. 30, 2021, in 9 pages.

* cited by examiner

*Primary Examiner* — Edward J Dudek, Jr.
(74) *Attorney, Agent, or Firm* — Duane Morris LLP (57) ABSTRACT

The present invention provides a method for controlling a data storage device. The data storage device includes a flash memory controller and a flash memory module. The flash memory controller has a first buffer memory and a second buffer memory. The memory module has at least a first memory portion and a second memory portion. The method includes: receiving a first data from a host device; storing the first data in the first buffer memory; transmitting the first data to the first memory portion of the flash memory module from the first buffer memory; and transmitting the first data to a host memory buffer in the host device from the first buffer memory. The first data corresponds to at least a portion of a second data to be written to the second memory portion.

18 Claims, 9 Drawing Sheets

METHODS FOR CONTROLLING DATA STORAGE DEVICE, AND ASSOCIATED FLASH MEMORY CONTROLLER

CROSS-REFERENCE TO RELATED APPLICATIONS

This disclosure claims priority to U.S. Provisional Patent App. No. 63/107,420, filed on Oct. 29, 2020, which is hereby incorporated by reference in its entirety.

BACKGROUND OF THE INVENTION

1. Field of the Invention

The present invention relates to a data storage device, a flash memory controller, a host, and a method for controlling a data storage device, a flash memory controller, and a host.

2. Description of the Prior Art

In recent years, due to the continuous development of memory technology, a variety of portable or non-portable data storage devices, e.g., universal flash storage (UFS) standard memory cards, solid state disk (SSD), and an embedded storage device conforming to UFS or EMMC specifications) are widely implemented in many applications. Therefore, the access control of memory in these data storage devices has become a rather hot topic.

The commonly used NAND flash memory mainly comprises single level cell (SLC), multiple-level cell (MLC), triple-level cell (TLC), and quad-level cell (QLC) flash memories. The QLC flash memory has gradually become a favorable configuration for the NAND flash memory due to its higher storage density and larger memory capacity.

A word line of the QLC comprises four pages of storage space. If those pages of storage space are not fully written, the NAND flash controller may not obtain the correct data from those written pages. Even worse, if a whole block of the QLC is not fully written, the NAND flash controller may not obtain the correct data from those written pages. Such problems must be solved since they may compromise the data integrity.

SUMMARY OF THE INVENTION

To solve at least the above problems, one objective of the present invention is to provide a method for controlling a flash memory and a related controller, memory system and host.

An embodiment of the present invention discloses a method for controlling a data storage device. The data storage device includes a flash memory controller and a flash memory module. The flash memory controller has a first buffer memory and a second buffer memory. The memory module has at least a first memory portion and a second memory portion. The method includes: receiving a first data from a host device; storing the first data in the first buffer memory; transmitting the first data to the first memory portion of the flash memory module from the first buffer memory; and transmitting the first data to a host memory buffer in the host device from the first buffer memory. The first data corresponds to at least a portion of a second data to be written to the second memory portion.

Another embodiment of the present invention discloses a flash memory controller for controlling a flash memory module having at least a first memory portion and a second memory portion. The flash memory controller includes a first communication interface, a first buffer memory and a second communication interface. The first communication interface is configured to receive a first data from a host device. The first buffer memory is coupled with the first communication interface and configured to store the first data. The second communication interface is configured to transmit the first data to the first memory portion of the flash memory module from the first buffer memory. The first communication interface is further configured to transmit the first data from the first buffer memory to a host memory buffer of the host device. The first data corresponds to at least a portion of a second data to be written to the second memory portion.

Another embodiment of the present invention discloses a data storage device including a flash memory module and a flash memory controller. The flash memory module has at least a first memory portion and a second memory portion. The flash memory controller is coupled with the flash memory module. The flash memory controller includes a first communication interface, a first buffer memory, and a second communication interface. The first communication interface is configured to receive a first data from a host device. The first buffer memory is coupled with the first communication interface and configured to store the first data. The second communication interface is configured to transmit the first data from the first buffer memory to the first memory portion of the flash memory module. The first communication interface is further configured to transmit the first data from the first buffer memory to a host memory buffer of the host device. The first data corresponds to at least a portion of a second data to be written to the second memory portion.

Another embodiment of the present invention discloses a method for controlling a host device. The method includes: transmitting a first data to a data storage device through a first communication interface; receiving the first data from the data storage device through the first communication interface; and storing the first data received in a host memory buffer. The first data corresponds to at least a portion of a second data to be written to the data storage device.

The objectives of the present invention will no doubt become obvious to those of ordinary skill in the art after reading the following detailed description of the preferred embodiment that is illustrated in the various figures and drawings.

DETAILED DESCRIPTION

Figure 1:
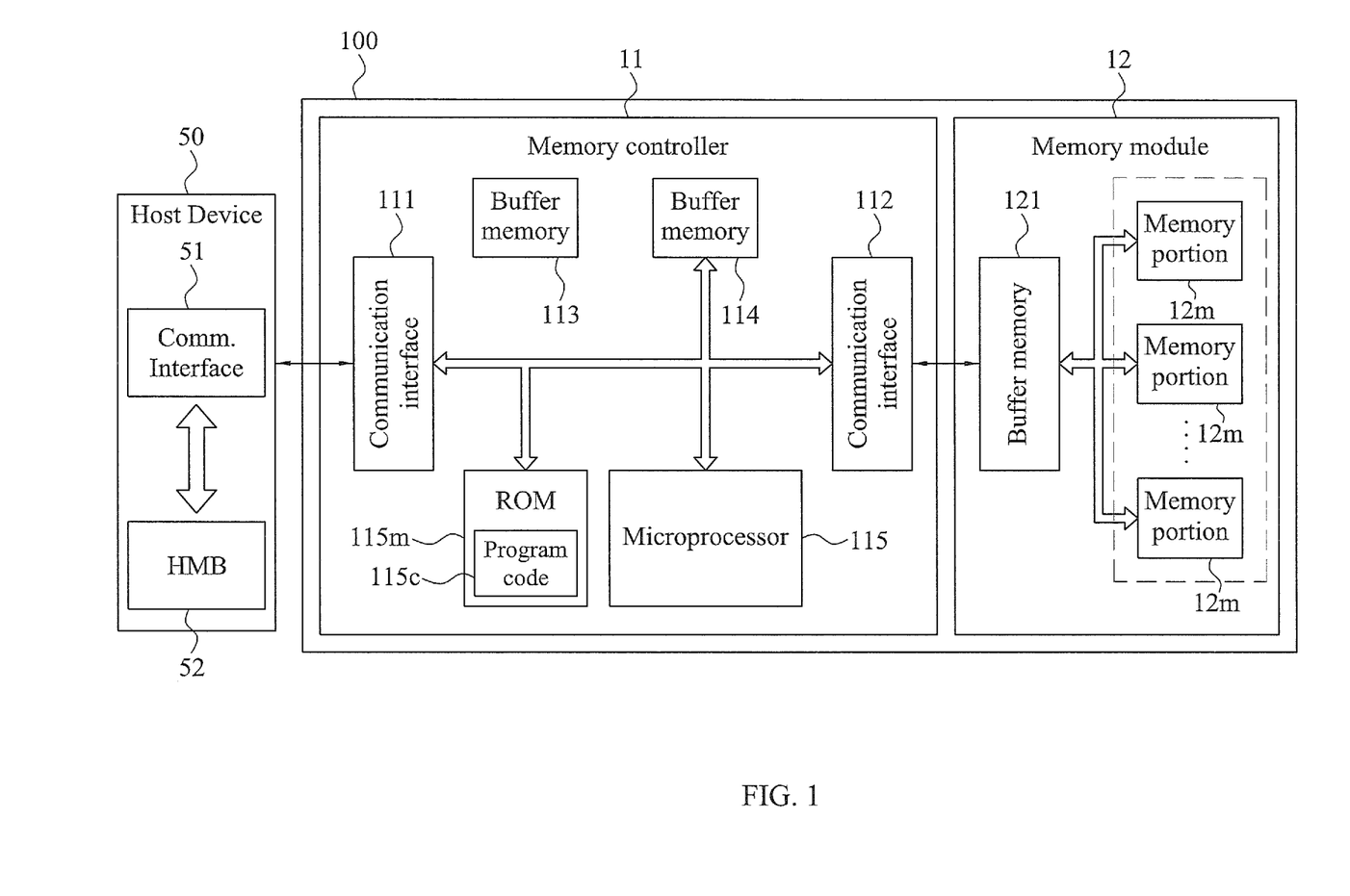
FIG. 1 is a schematic diagram illustrating a data storage device and a host device according to some embodiments of the present invention.

FIG. 1 is a schematic diagram of a data storage device 100 and a host device 50 according to some embodiments of the present invention. The data storage device 100 may include a portable or non-portable data storage device, for example, a memory card conforming to the SD/MMC, CF, MS, or XD standard, a non-volatile (NV) memory device, a flash memory device, or a solid state drive (SSD). The host device 50 may include a multifunctional mobile phone, a tablet, a wearable device, and a personal computer such as a desktop computer or a laptop. The data storage device 100 may be in communication with the host device 50 via a wire, a system bus, or wirelessly. Data may be transmitted between the data storage device 100 and the host device 50.

As shown in FIG. 1, the data storage device 100 may include a memory controller 11, and a memory module 12. The memory controller 11 may be in communication with the memory module 12 via a wire, a system bus, or wirelessly. The memory controller 11 may be configured to access the memory module 12. The memory module 12 may be configured to store data. The memory controller 11 may include an NV memory controller, a flash memory controller, or the like. The memory module 12 may include an NV memory module, a flash memory module, or the like.

In some embodiments, the memory controller 11 may write system operation information into the memory module 12, e.g., redundant array of independent disks (RAID) information, an error correction code (ECC) parity, a mapping table, a control flag, etc. The system operation information may be added in any step of writing the data, e.g., data randomizing process or the like.

As shown in FIG. 1, the memory controller 11 may include a communication interface 111, a communication interface 112, a buffer memory 113, a buffer memory 114, a microprocessor 115, and a read only memory (ROM) 115m, wherein these components may be coupled to one another via a bus.

The host device 50 can indirectly access the memory module 12 in the data storage device 100 by sending a plurality of host device commands and corresponding logical addresses to the memory controller 11. The memory controller 11 may receive the plurality of host device commands and the logical address through the communication interface 111. The memory controller 110 may translate the plurality of host device commands into memory operation commands, and then control the memory module 12 to perform reading, writing/programming, or erasing on memory units or pages having a specific physical address within the memory module 12. The physical address may correspond to a logical address.

The communication interface 111 may receive or transmit one or more host device commands. The communication interface 111 may receive or transmit data, wherein the data may include one or more logical addresses, or pages of data. The communication interface 112 may receive or transmit one or more memory operation commands. The communication interface 112 may receive or transmit data, wherein the data may include one or more physical addresses, or pages of data. The communication interface 111 may be a bus protocol for communication from the host device 50, e.g., an integrated circuit therein, to the microcontroller 115, or the buffer memories 113 and 114 of the memory controller 11. The communication interface 112 may be a bus protocol for communication from the memory controller 11 to the memory module 12. The communication interface 111 or communication interface 112 may conform to a specific communications specification (e.g., the serial advanced technology attachment (SATA) specification, the universal serial bus (USB) specification, the peripheral component interconnect express (PCIE) specification)) or to the non-volatile memory express (NVMe), and may perform communications based on this specific communications specification. The communication interface 111 may be an NVMe interface. The communication interface 112 may be a flash interface.

The buffer memory 113 may be implemented with a random access memory (RAM). The buffer memory 114 may be implemented with a random access memory (RAM). The buffer memory 113 may be configured to store information. The buffer memory 113 may be configured to store a page of data, or a host device command from the host device 50. The buffer memory 114 may be configured to store information. The buffer memory 114 may be configured to store a page of data. The buffer memory 113 or the buffer memory 114 may include a random access memory (RAM).

The microprocessor 115 may be configured to execute a program code 115c stored in the ROM 115m in order to control access of the memory module 12. It should be noted that the program code 115c may also be stored in the buffer memory 113, the buffer memory 114, or in any type of memory.

The memory module 12 may include a buffer 121, and a plurality of memory portions 12m, wherein these components may be coupled to one another via a bus. The buffer 121 may be communicated with the memory controller 11, e.g., the communication interface 112. The buffer 112 may be configured to store one or more memory operation commands from the memory controller 11. The buffer 112 may be configured to store a data including physical addresses from the memory controller 11. The buffer 112 may be configured to store pages of data. The number of the memory portions 12m may be greater than one. The memory portions may include, but are not limited to, a plurality of flash memory chips or dies. The memory portions 12m may include SLC, MLC, TLC, or QLC. For example, each of the memory portions 12m can comprise a plurality of blocks. One block comprising N word-lines {WL(0), WL(1), WL(2), . . . WL(N−3), WL(N−2), WL(N−1)} can be taken as an example of any one of the plurality of blocks, wherein N is a positive integer. The memory controller 11 can write the user data to one page of a word-line in the block by using the QLC writing mode. In other words, a word-line of QLC can store four pages of user data. In some embodiments, the memory controller 11 can write the user data to one page of a word-line in the block by using the SLC, MLC, or TLC writing mode, and the verification of the written data can be done before the writing to the whole block is completed. In some embodiments, each of the memory portions 12m may function as SLC, MLC, TLC, or QLC. The memory module 12 may include a microprocessor (not shown) configured to arrange each of the memory portions 12m that operate in an SLC, MLC, TLC, or QLC operating mode.

There are various techniques for manufacturing the memory module 12; for example, a 2D/planar NAND flash technology in which memory cells are arranged in a single layer, and a 3D NAND flash technology in which memory cells are arranged in multiple layers and vertically stacked. According to some embodiments, the memory module 12 can be implemented as a planar NAND flash architecture having a single layer of memory cells. According to some embodiments, the memory module 12 can be implemented as a 3D NAND flash architecture having memory cells stacked vertically in multiple layers.

Still referring to FIG. 1, the host device 50 may include a communication interface 51 and a host memory buffer 52. The communication interface 51 may transmit one or more host device commands. The communication interface 51 may receive or transmit data, wherein the data may include one or more logical addresses, or pages of data. The communication interface 51 may conform to a specific communications specification (e.g., the serial advanced technology attachment (SATA) specification, the universal serial bus (USB) specification, the peripheral component interconnect express (PCIE) specification)) or to the non-volatile memory express (NVMe), and may perform communications according to this specific communications specification. The communication interface 51 may be an NVMe interface.

The host buffer memory (HMB) 52 may be a portion of an internal storage of the host device 50 (i.e., the host memory). The HMB 52 may have a capacity with 64 megabyte (MB) or 128 MB or more. The HMB 52 may include random access memory (RAM) or read-only memory (ROM).

The EIMB 52 may provide random access to a block of host memory, which gives access to all elements in the HMB 52. On the data storage device side, the HMB 52 may transfer data across the system bus as quickly as possible instead of attempting to optimize bus bandwidth. On the host side, the HMB 52 and the communication interface 51 may provide low overhead access to memory, which allows high-performance access to the physical memory.

Figure 2:
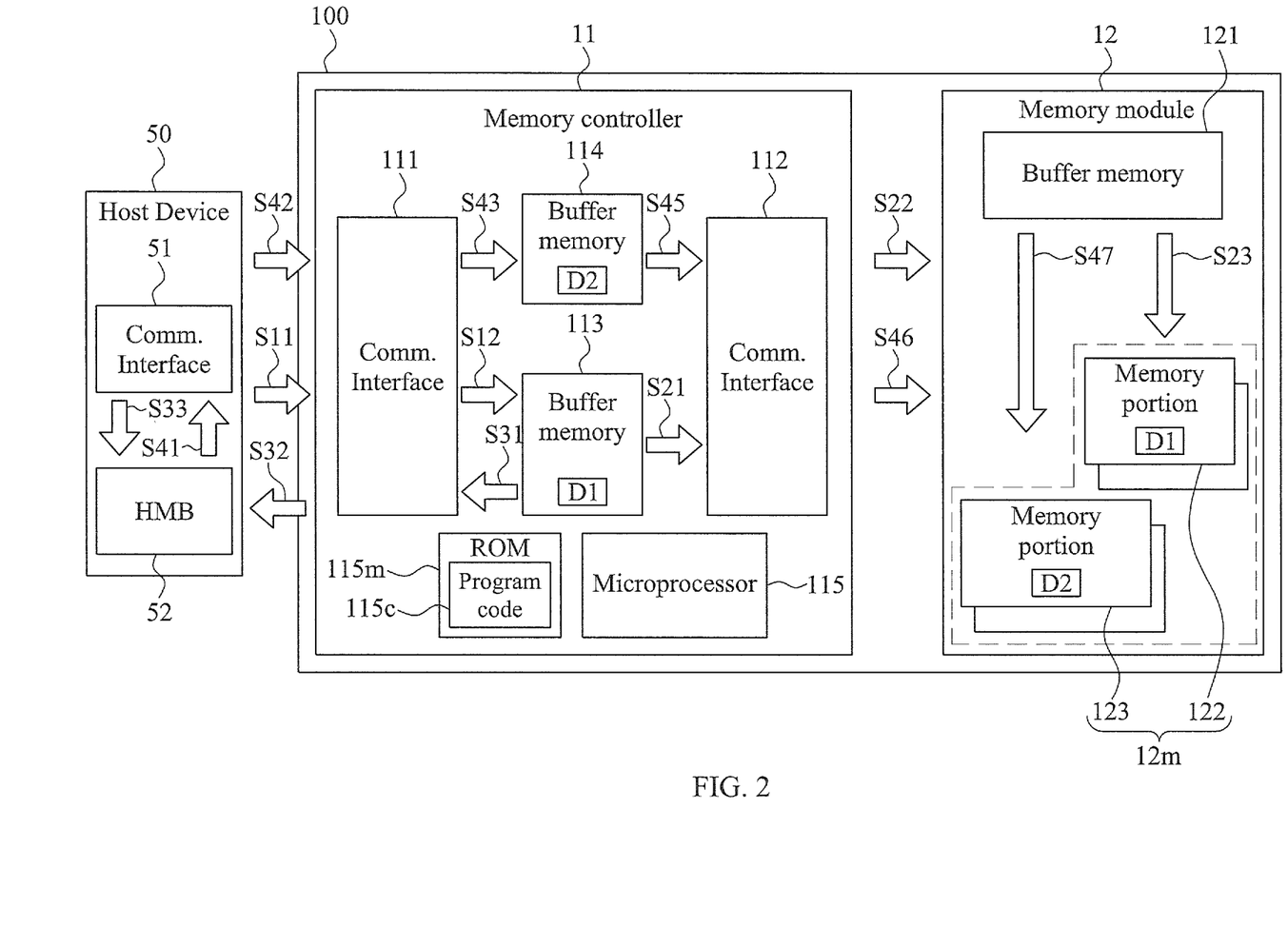
FIG. 2 is a schematic diagram illustrating a write sequence in a data storage device and a host device according to some embodiments of the present invention.

FIG. 2 is a schematic diagram illustrating a write sequence in a data storage device (e.g., the data storage device 100) and a host device (e.g., the host device 50) according to some embodiments of the present invention. The operations disclosed in the embodiments of FIG. 2 as discussed in the following paragraphs/sections may be controlled by the microprocessor 115 when it executes one or more codes of the program code 115c.

As shown in FIG. 2, the host device 50 may transmit data or host device commands to the data storage device 100 (S11). The communication interface 111 of the data storage device 100 may be configured to receive data or host device commands from the host device 50 (S11). The communication interface 111 may be configured to receive a data D1 from the host device 50. The data D1 may include a page of data. In alternative embodiments, the data D1 may include a plurality of data pages. The communication interface 111 may be configured to transmit the data D1 to the buffer memory 113 (S12), which is coupled with the communication interface 111 via, for example, a bus. The buffer memory 113 may be configured to store the data D1.

The buffer memory 113 may be configured to transmit the data D1 to the communication interface 112 (S21). The communication interface 112 may be configured to transmit the data D1 to the buffer memory 121 (S22). The memory portions 12m may include one or more memory portions 122 and one or more memory portions 123 (i.e., one or more QLC memory portions). The memory portions 123 may include SLC or QLC. The memory portions 123 may include SLC. In other words, the memory portion 122 may have an SLC operating mode and the memory portion 123 may have a QLC operating mode. The buffer memory 121 is coupled with the memory portions 122 and the memory portions 123 via, e.g., a bus. The buffer memory 121 may be configured to transmit the data D1 to the memory portion 122 (S23). In some embodiments, the communication interface 112 may be configured to transmit the data D1 to one of the memory portions 122 of the memory portions 12m from the buffer memory 113.

In some embodiments, the microprocessor 115 may be configured to generate a signal indicating that the memory portion 122 is written with the data D1. The signal may be transmitted via the communication interface 111 to the host device 50 after the transmission of the data D1 from the buffer memory 113 to the memory portion 122 of the memory module 12.

The buffer memory 113 may be configured to transmit the data D1 to the communication interface 111 (S31) and then the communication interface 111 may be configured to transmit the data D1 to the communication interface 51 (S32). The communication interface 51 may be configured to transmit the data D1 to the HMB 52 (S33). In some embodiments, the communication interface 111 may be configured to transmit the data D1 from the buffer memory 113 of the memory controller 11 to the HMB 52 of the host device 50.

The HMB 52 may be configured to transmit the data D1 to the communication interface 51 (S41), and then the communication interface 51 may be configured to transmit the data D1 to the communication interface 111 (S42). The microprocessor 115 may be configured to generate a data D2 by modifying the data D1; for example, with error correction code (ECC), parity technique, or the like. The data D1 may correspond to at least a portion of the data D2. The data D2 may include a plurality of pages of data. The communication interface 111 may be configured to transmit the data D2 to the buffer memory 114 (S43). In some embodiments, the data D2 may be transmitted via the communication interface 111 from the HMB 52 to the buffer memory 114. The buffer memory 114 may be configured to transmit the data D2 to the communication interface 112 (S45). The communication interface 112 may be configured to transmit the data D2 to the buffer memory 121 (S46). The buffer memory 121 may be configured to transmit the data D2 to one of the memory portions 123 (S47). In some embodiments, the communication interface 112 may be configured to transmit the data D2 to one of the memory portions 123 of the memory module 12 from the buffer memory 114.

In some embodiments, the microprocessor 115 may be configured to generate an erase signal indicating an erasure of the data D1. The communication interface 111 may be configured to transmit the erase signal to the HMB 52 after the data D2 is transmitted to the memory portion 123. In some embodiments, a transmission rate of the data D1 from the buffer memory 113 to the memory portions 122 of the memory portions 12m is greater than that of the data D2 from the buffer memory 114 to the memory portions 123 of the memory module 12.

In some comparative embodiments, a memory controller may be configured to implement a write operation for storing one or more pages of data from a host device to a QLC memory portion of a memory module. However, a word line of QLC comprises four pages of storage space. The write operation of the QLC uses different sensing levels (e.g., 16 sensing levels with different biases) to define different charged states (e.g., 16 charged states) and the write operation of each of the QLC memory portion is executed in sequence. If the 4 pages of storage space are not fully written, the QLC may not store complete and correct pages of data. When an issue of open word line or sudden power loss occurs, the QLC memory portion may not store complete pages of data if the write operation has been executed only by writing the data page with a first sensing level, e.g., most significant bit (MSB). Thus, the pages of data which are supposed to be stored in the memory module may be missing or damaged. That is, the memory controller may only obtain the written data after the QLC block been fully written. As a result, the memory controller shall keep a whole block of data until a whole QLC block had been successfully written. That will spend lots of memory space.

In the present invention, a double write operation can be realized. The data D1 is transmitted from the buffer memory 113 to the memory portion 122 and the data D2 corresponding to the data D1 is transmitted from the buffer memory 114 to the memory portion 123. The data D1 may be stored in the memory portion 122 before the write operation of the data D2 is completed in the memory portion 123. The memory controller 11 may set the write operation of the memory portion 122 to have a higher priority than that of the memory portion 123 to ensure the latency of the data storage device 100. As such, an issue of open word line or sudden power loss can be solved and the speed and capacity of the data storage device can be retained. Storing the data D1 in the memory portion 122 ensures the data integrity transmitted from the host device 50 to the data storage device 100, and that storing the second data D2 in the memory portion 123 retains the capacity of the memory module 12. Furthermore, the data D1 may be stored in the ITIMB 52 before the write operation of the data D2 is completed in QLC portion 123. As such, an issue of open word line or sudden power loss can be addressed. Storing the data D1 in the HMB 52 ensures the data integrity transmitted from the host device 50 to the data storage device 100. Furthermore, the size of the HMB 52 can be relatively small since the data D1 in the HMB 52 may be erased after the transmission of the data D2 is completed.

Figure 3:
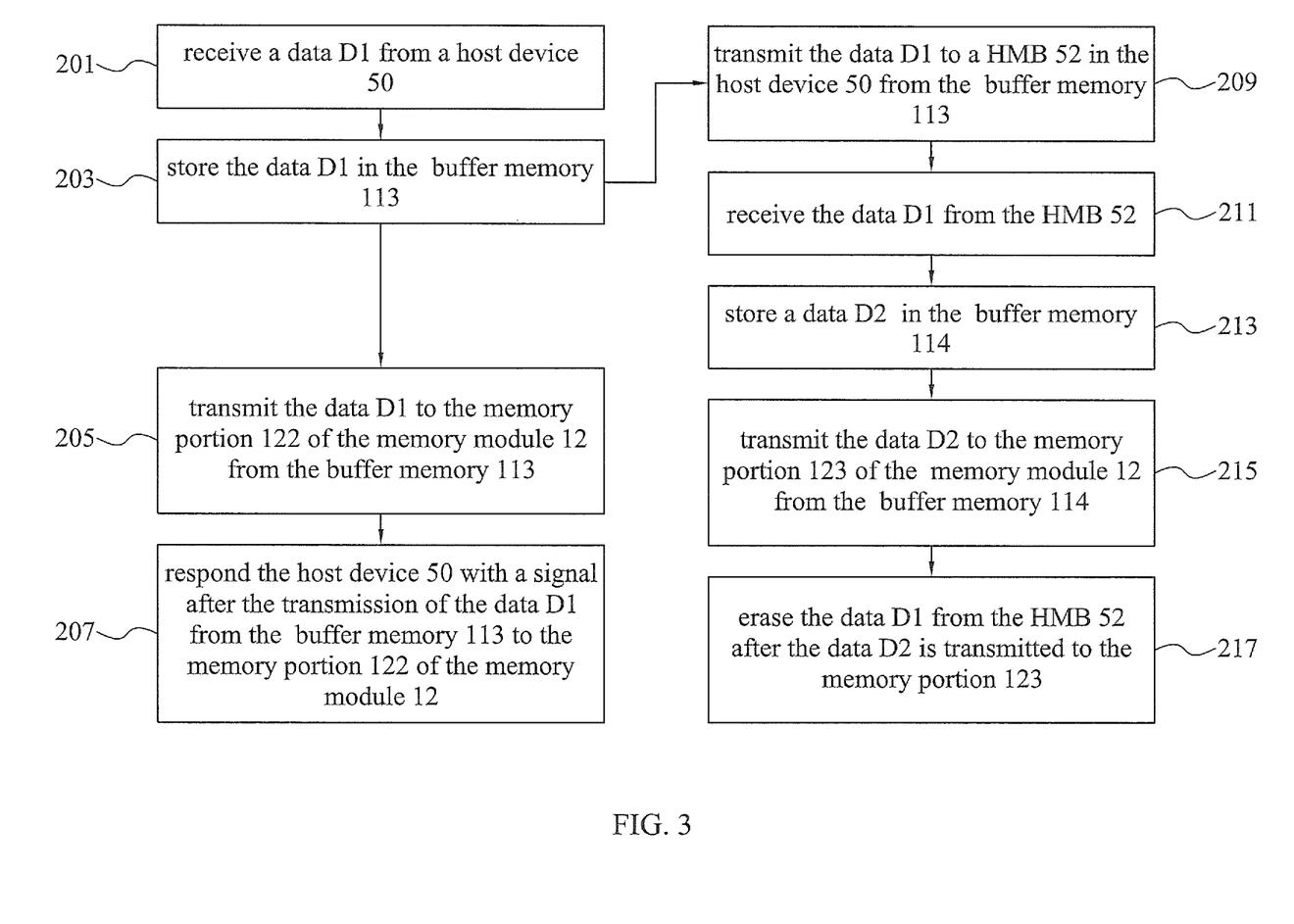
FIG. 3 is a flow chart of a method for controlling a data storage device and a host device in a write sequence according to some embodiments of the present invention.

FIG. 3 is a flow chart of a method for controlling a data storage device (e.g., the data storage device 100) and a host device (e.g., the host device 50) in a write sequence according to some embodiments of the present invention. The detailed steps are as follows:

Step 201: The data storage device 100 may receive a data D1 from the host device 50. The data D1 may include a page of data. In alternative embodiments, the data D1 may include a plurality of pages of data. The data D1 may be received via the communication interface 111.

Step 203: The data storage device 100 may store the data D1 in the buffer memory 113. The data D1 may be transmitted from the communication interface 111 to the buffer memory 113.

Step 205: The data storage device 100 may transmit the data D1 to the memory portion 122 of the memory module 12 from the buffer memory 113. The data D1 may be transmitted via the communication interface 112.

Step 207: The data storage device 100 may respond to the host device 50 with a signal after the transmission of the data D1 from the buffer memory 113 to the memory portion 122 of the memory module 12. The signal indicates that the memory portion 122 is written with the data D1. The signal may be transmitted via the communication interface 111.

Step 209: The data storage device 100 may transmit the data D1 to the HMB 52 in the host device 50 from the buffer memory 113. The data D1 may be transmitted via the communication interface 111.

Step 211: The data storage device 100 may receive the data D1 from the HMB 52. Furthermore, the host device 50 may transmit a request for the data D1 to the data storage device 100 if the data D1 in the HMB 52 is not available.

Step 213: The data storage device 100 may store the data D2 in the buffer memory 114. The data D1 may correspond to at least a portion of the data D2. The data D2 may be generated by the microprocessor 115 by modifying the data D1; for example, error correction code (ECC), parity technique, or the like.

Step 215: The data storage device 100 may transmit the data D2 to the memory portion 123 of the memory module 12 from the buffer memory 114. The data D2 may be transmitted via the communication interface 112.

Step 217: The host device 50 may erase the data D1 from the HMB 52 after the data D2 is transmitted to the memory portion 123. The data storage device 100 may generate and transmit an erase signal to the host device 50 via the communication interface 111. The host device 50 may, in response to the erase signal, erase the data D1 from the HMB 52. Furthermore, the host device 50 may transmit, to the HMB 52, the erase signal indicating an erasure of the data D1 after the data D2 is successfully written to the data storage device 100.

Persons skilled in the art would understand from the above disclosure that the order of the above steps may be adjusted, such as adjusting the order of the steps to be performed or adding additional step(s).

Figure 4:
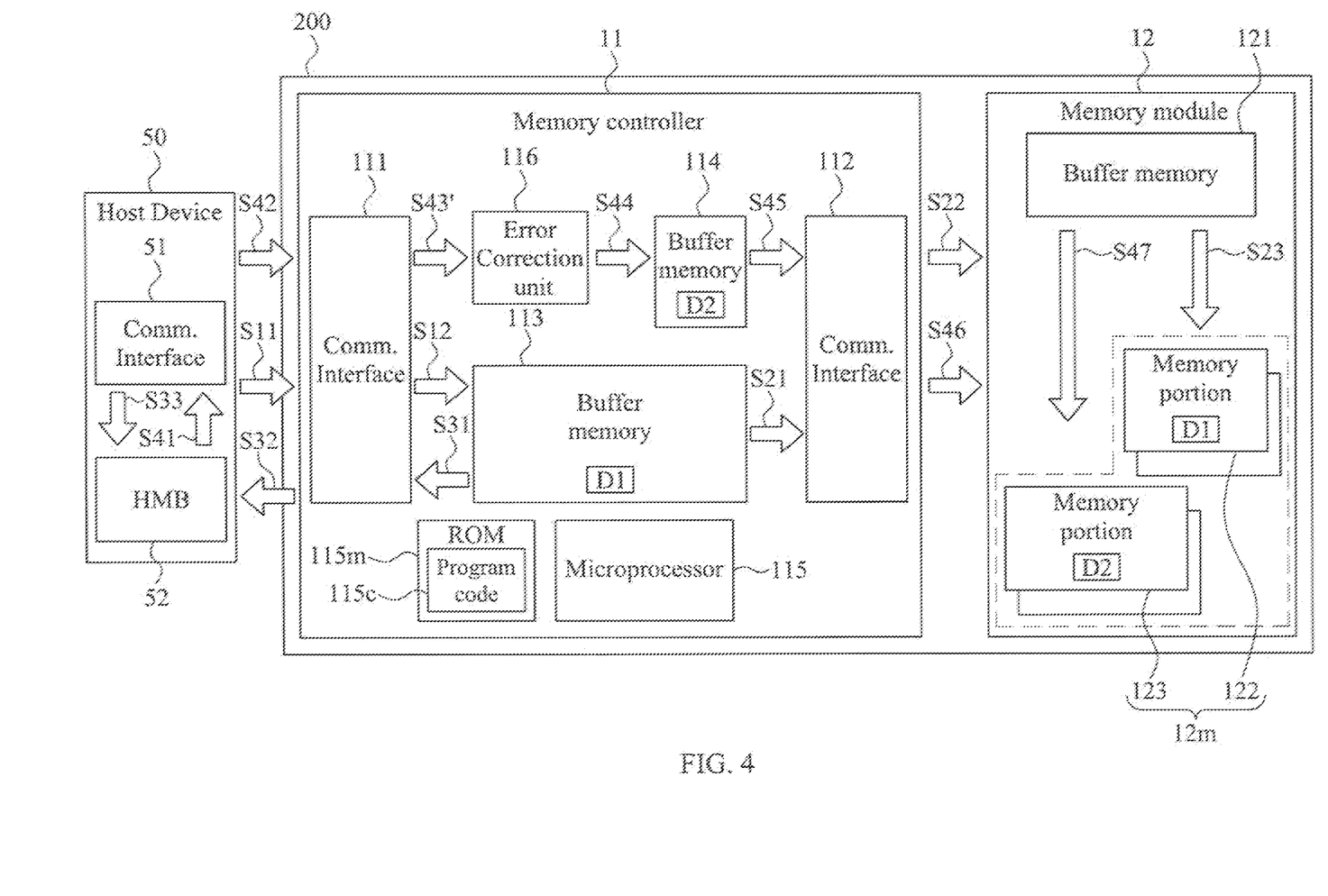
FIG. 4 is a schematic diagram illustrating a write sequence in a data storage device and a host device according to some embodiments of the present invention.

FIG. 4 is a schematic diagram illustrating a write sequence in a data storage device 200 and a host device (e.g., the host device 50) according to some embodiments of the present invention. The operations related to the embodiments of FIG. 4 as discussed below may be controlled by the microprocessor 115 when it executes one or more codes of the program code 115c.

The data storage device 200 is similar to the data storage device 100 in FIG. 1 and FIG. 2, except the memory controller 11, the data storage device 200 further includes an error correction unit 116. The error correction unit 116 may be coupled with the communication interface 111 and the buffer memory 114 via, e.g., a bus. The data D1 may be transmitted via the communication interface 111 from the HMB 52 to the error correction unit 116 (S43'). The error correction unit 116 may be configured to generate the data D2 in response to an error correction of the data D1. The data D2 may be generated based on error corrections of a plurality of data D1 received. The error correction unit 116 may be configured to transmit the data D2 to the buffer memory 114 (S44). The error correction of the data D1 may include ECC, parity technique, or the like. The error correction of theta D1 detects and corrects n-bit data corruption which occurs in memory to ensure the data integrity. The error correction unit 116 may be a portion of the microprocessor 115. The error correction unit 116 may be integrated in the microprocessor 115. Furthermore, the microprocessor 115 may be able to implement an error correction when executing the program codes 115c.

In some comparative embodiments, stored data pages may be directly copied from a memory portion to another memory portion in a memory module. However, the stored data pages may contain bits which have been flipped to the wrong state. The stored data pages may be incorrect and the memory module may not be able to detect and correct the error. As such, an issue of blind copy may occur. In the present invention, the data D1 has been detected, corrected, and then translated into the data D2. The present invention guarantees the data integrity from the host device 50 to the memory module 12.

Figure 5:
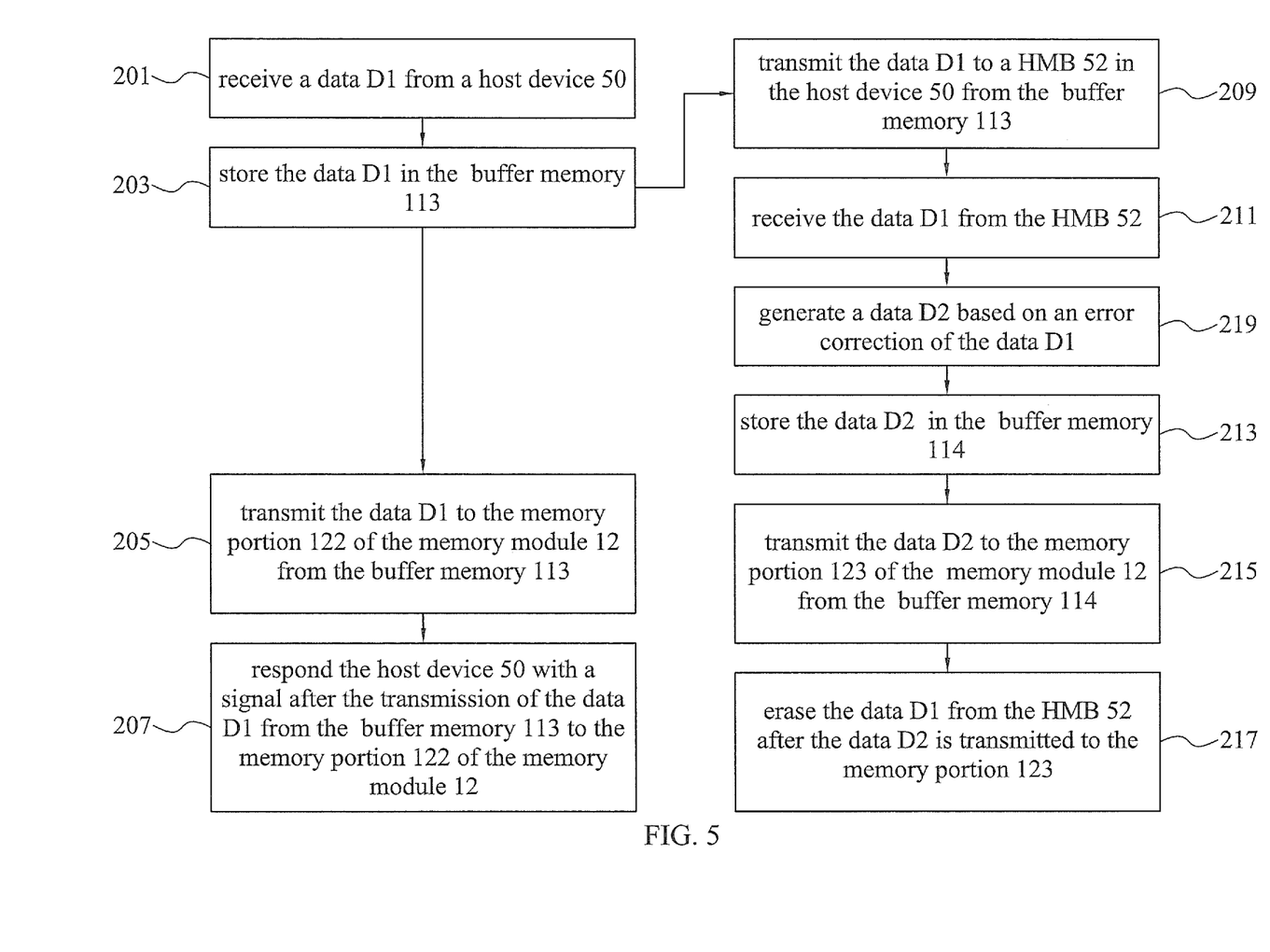
FIG. 5 is a flow chart of a method for controlling a data storage device and a host device in a write sequence according to some embodiments of the present invention.

FIG. 5 is a flow chart of a method for controlling a data storage device (e.g., the data storage device 200) and a host device (e.g., the host device 50) in a write sequence according to some embodiments of the present invention.

The flow chart of the method of FIG. 5 is similar to the flow chart of the method of FIG. 3, except that the method of FIG. 5 further includes a step 219. In the step 219, the error correction unit 116 may generate the data D2 based on an error correction of the data D1.

Persons skilled in the art would understand from the above disclosure that the order of the above steps may be adjusted, such as adjusting the order of the steps to be performed or adding additional step(s).

Figure 6:
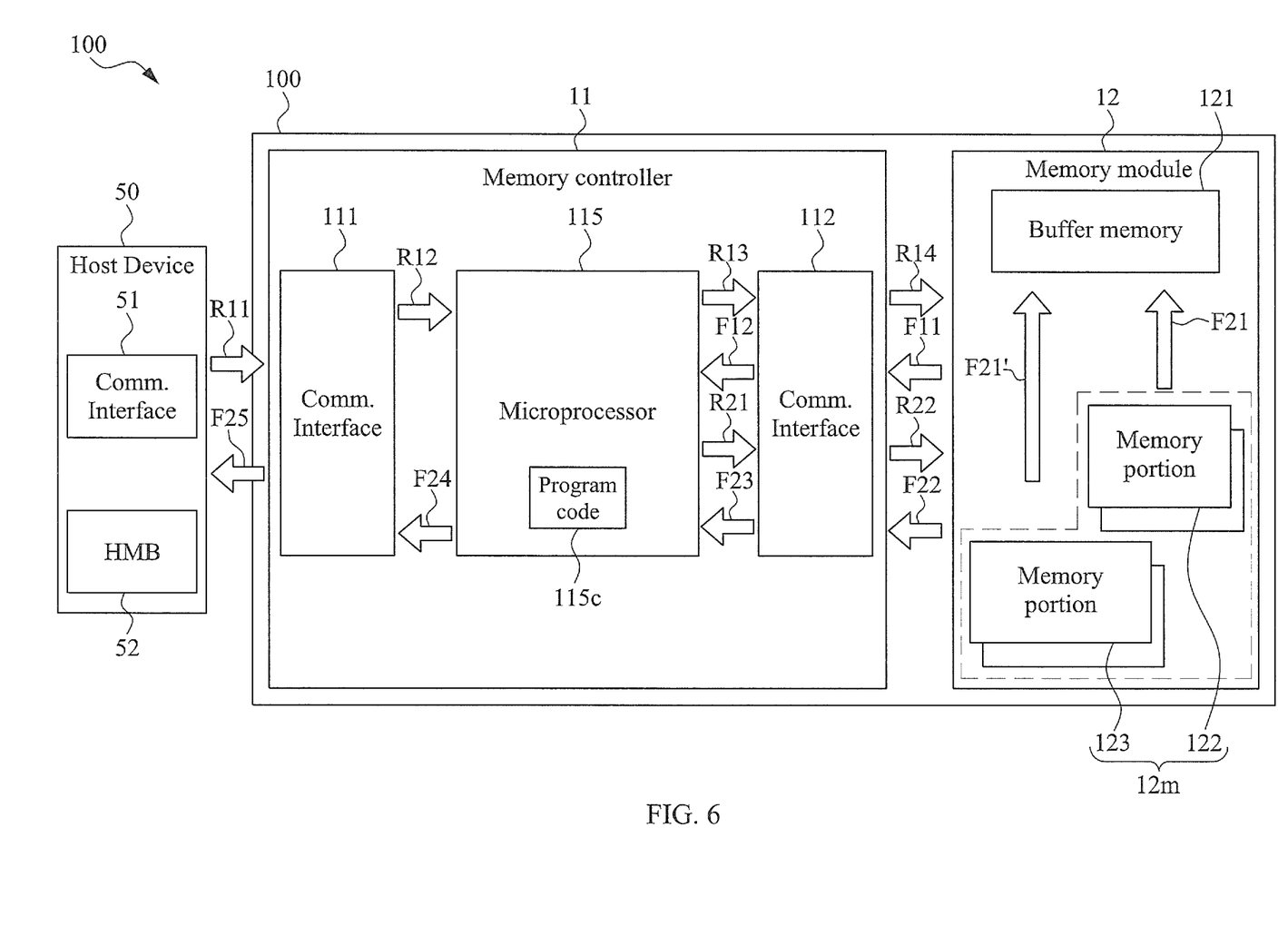
FIG. 6 is a schematic diagram illustrating a read sequence in a data storage device and a host device according to some embodiments of the present invention.

FIG. 6 is a schematic diagram illustrating a read sequence in a data storage device (e.g., the data storage device 100 or 200) and a host device (e.g., the host device 50) according to some embodiments of the present invention. The operations related to the embodiments of FIG. 6 as discussed below may be controlled by the microprocessor 115 when it executes one or more codes of the program code 115c.

As shown in FIG. 6, the host device 50 may send a host device command to request an access or a read operation to the memory module 12 (R11). A read request associated with the data D2 from the host device 50 may be received by the communication interface. The communication interface 111 may be configured to transmit the read request to the microprocessor 115 (R12). The microprocessor 115 may be configured to, in response to the read request, send a memory operation command to detect whether the memory portion 123 of the memory module 12 is fully written (R13/R14). The memory module 12 may be configured to provide feedback on the status of the memory portion 123, in which the data D2 is assigned to be stored by the microprocessor 115 (F11/F12). The microprocessor 115 may be configured to, in response to the status of the memory portion 123, send a memory device command to access the memory module 12 (R21/R22). If the memory portion 123 of the memory module 12 is not fully written, the data D1 is transmitted via the communication interface 112 from the memory portion 122 to the memory controller 11 (F21/F22/F23). If the memory portion 123 of the memory portions 12m of the memory module 12 is fully written, the data D2 may be transmitted via the communication interface 112 from the memory portion 123 to the memory controller 11 (F21'/F22/F23). The microprocessor 115 may be configured to, depending on the status of the memory portion 123, transmit the data D1 or the data D2 through the communication interface 111 to the host device 50. As such, when the memory portion 123 is not yet fully written, the memory controller 11 may access the data D1 in the memory portion 122, such that an issue of open word line, i.e., reading an incomplete page of data, can be addressed. When the memory portion 122 has received four SLC blocks of data or the memory portion 123 is fully written with the data D2, the memory controller 11 may access the data D2. Meanwhile, the memory controller 11 may erase the data D1 in the memory portion 122.

Figure 7:
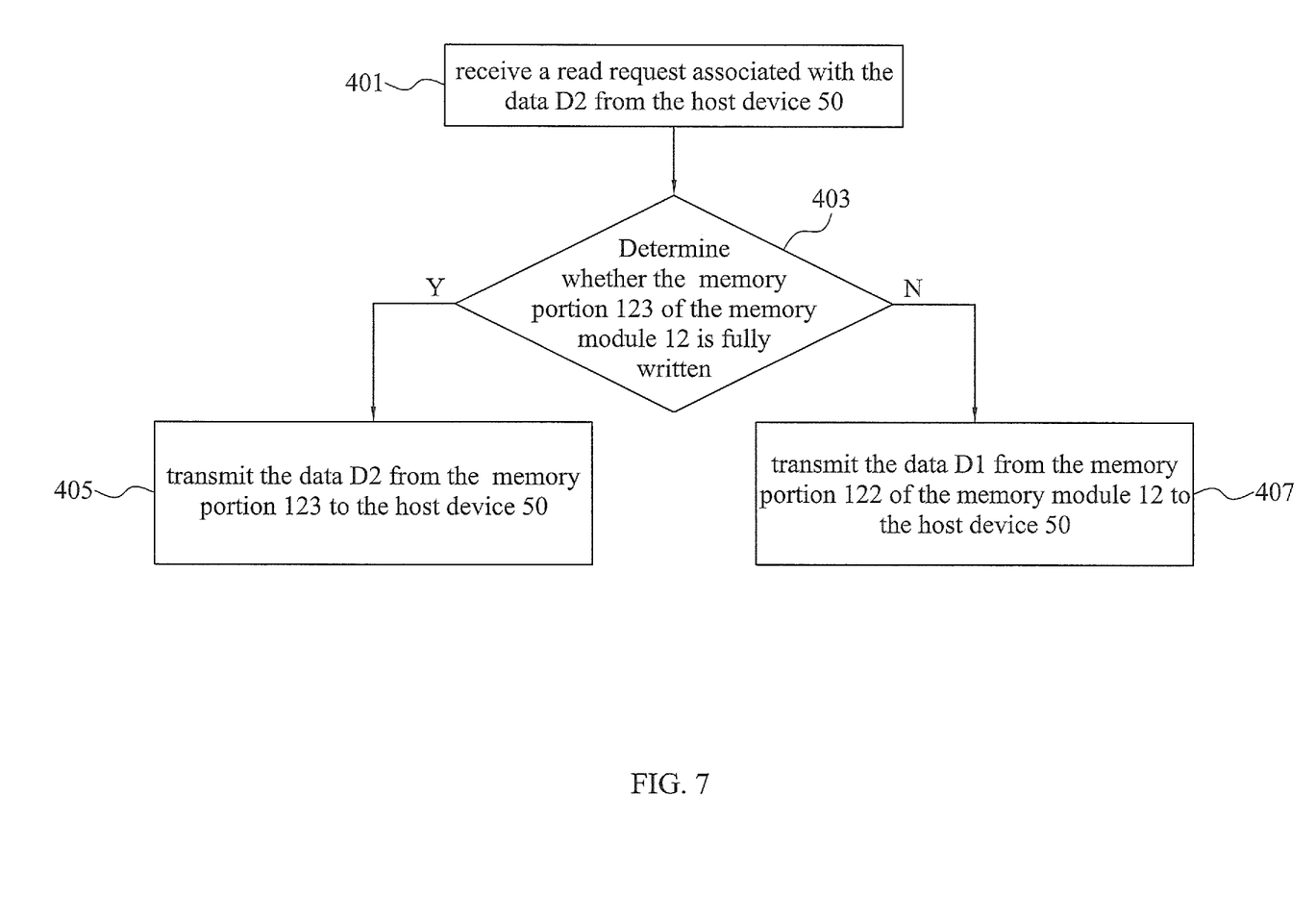
FIG. 7 is a flow chart of a method for controlling a data storage device and a host device in a read sequence according to some embodiments of the present invention.

FIG. 7 is a flow chart of a method for controlling a data storage device (e.g., the data storage device 100 or the data storage device 200) and a host device (e.g., the host device 50) in a read sequence according to some embodiments of the present invention.

Persons skilled in the art would understand from the above disclosure that the order of the above steps may be adjusted, such as adjusting the order of the steps to be performed or adding additional step(s). The detailed steps are as follows:

Step 401: The data storage device 100 may receive a read request associated with the data D2 from the host device 50.

Step 403: The data storage device 100 may determine whether the memory portion 123 of the memory module 12 is fully written. If the memory portion 123 is fully written, the flow chart continues to Step 405. If not, the flow chart continues to Step 407.

Step 405: The data storage device 100 may transmit the data D2 from the memory portion 123 of the memory portions module 12 to the host device 50.

Step 407: The data storage device 100 may transmit the data D1 from the memory portion 122 of the memory module 12 to the host device 50.

Persons skilled in the art would understand from the above disclosure that the order of the above steps may be adjusted, such as adjusting the order of the steps to be performed or adding additional step(s).

Figure 8:
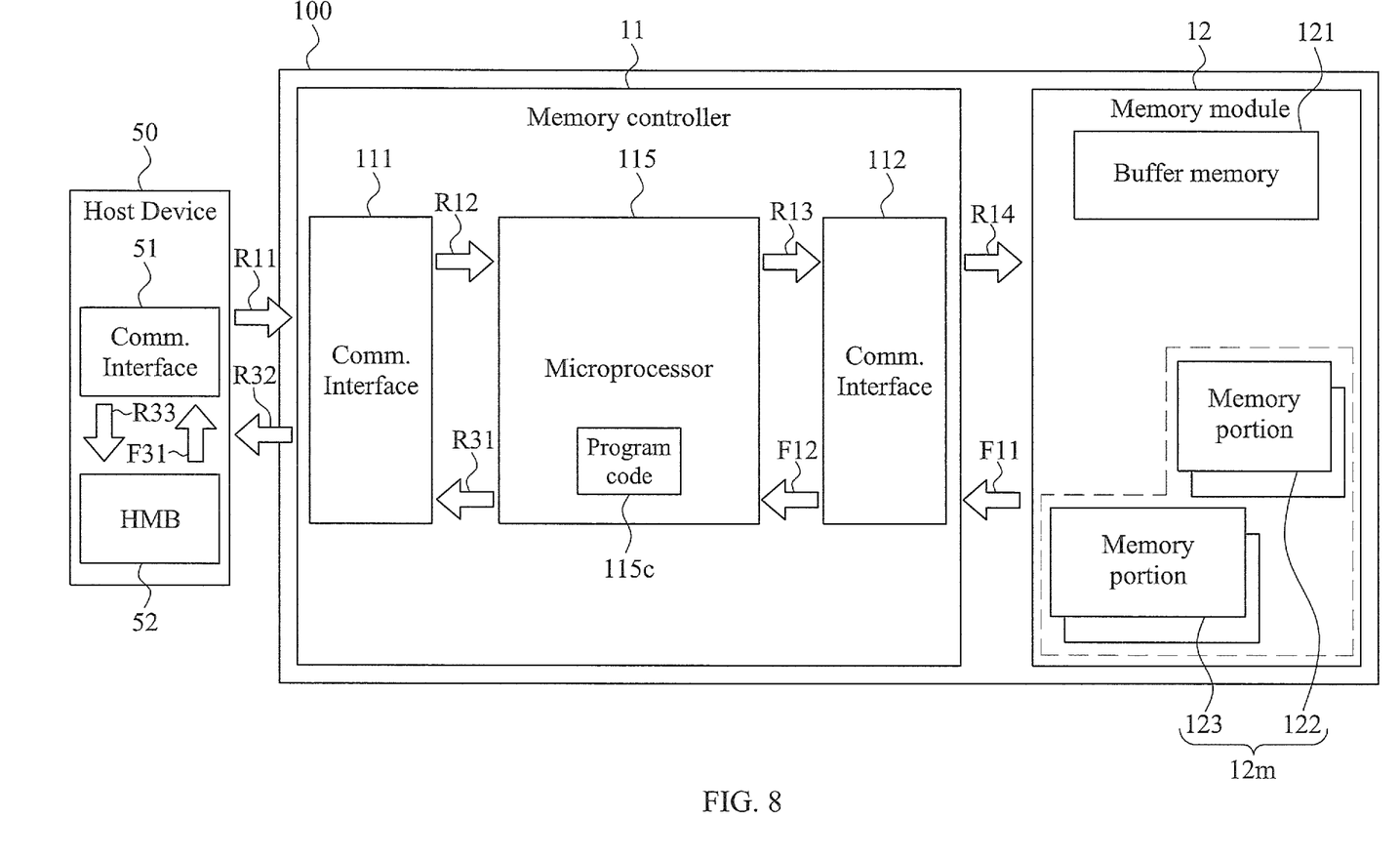
FIG. 8 is a schematic diagram illustrating a read sequence in a data storage device and a host device according to some embodiments of the present invention.

FIG. 8 is a schematic diagram illustrating a read sequence in a data storage device (e.g., the data storage device 100 or 200) and a host device (e.g., the host device 50) according to some embodiments of the present invention. The operations related to the embodiments of FIG. 8 as discussed below may be controlled by the microprocessor 115 when it executes one or more codes of the program code 116c.

As shown in FIG. 6, the host device 50 may send a host device command to request an access or a read operation to the memory module 12 (R11). A read request associated with the data D2 from the host device 50 may be received by the communication interface. The communication interface 111 may be configured to transmit the read request to the microprocessor 115 (R12). The microprocessor 115 may be configured to, in response to the read request, send a memory operation command to detect whether the memory portion 123 of the memory module 12 is fully written (R13/R14). The memory module 12 may be configured to provide feedback on the status of the memory portion 123, in which the data D2 is assigned to be stored by the microprocessor 115 (F11/F12). If the memory portion 123 of the memory module 12 is not fully written, the memory controller 11 may be configured to send an access request to the HMB 52 through the communication interface 111 (R31/R32/R33). The data D1 may be read from the HMB 52 for the use of the host device 50 (F31).

Figure 9:
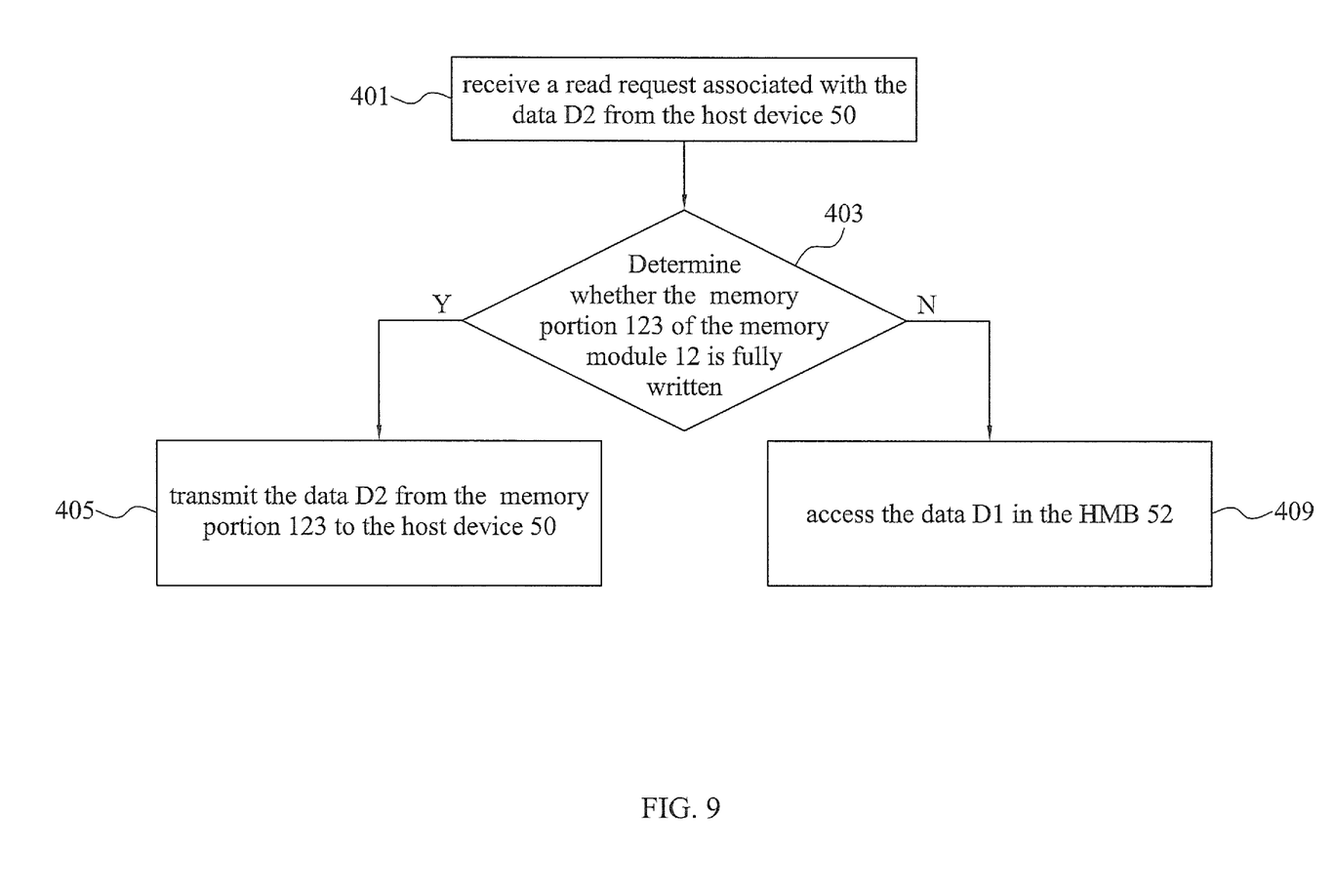
FIG. 9 is a flow chart of a method for controlling a data storage device and a host device in a read sequence according to some embodiments of the present invention.

FIG. 9 is a flow chart of a method for controlling a data storage device (e.g., the data storage device 100 or the data storage device 200) and a host device (e.g., the host device 50) in a read sequence according to some embodiments of the present invention.

The flow chart of the method of FIG. 9 is similar to the flow chart of the method of FIG. 8, except that Step 407 is replaced with Step 409. In Step 409, the host device 50 may, upon a request associated with the data D2, access the data D1 in the FMB 52 if the memory portion 123 is not fully written with the data D2.

Persons skilled in the art would understand from the above disclosure that the order of the above steps may be adjusted, such as adjusting the order of the steps to be performed or adding additional step(s).

The present disclosure may further be described using the following clauses:

1. A method for controlling a memory storage device which comprises: a flash memory controller having a first buffer memory and a second buffer memory; and a flash memory module having at least a first memory portion and a second memory portion, the method comprising:
receiving a first data from a host device;
storing the first data in the first buffer memory;
transmitting the first data to the first memory portion of the flash memory module from the first buffer memory; and
transmitting the first data to a host memory buffer in the host device from the first buffer memory,
wherein the first data corresponds to at least a portion of a second data to be written to the second memory portion.

2. The method of clause 1, further comprising:
receiving the first data from the HMB;
generating the second data based on an error correction of the first data;
storing the second data in the second buffer memory; and
transmitting the second data to the second memory portion of the flash memory module from the second buffer memory.

3. The method of clause 2, wherein the second data is generated based on error corrections of a plurality of first data received.

4. The method of clause 2, wherein a transmission rate of the first data from the first buffer memory to the first memory portion is greater than that of the second data from the second buffer memory to the second memory portion.

5. The method of clause 2, further comprising: erasing the first data from the host memory buffer after the second data is transmitted to the second memory portion.

6. The method of clause 1, further comprising:
receiving a read request associated with the second data from the host device; and
if the second memory portion of the flash memory module is fully written, transmitting the second data from the second memory portion to the host device;
if the second memory portion of the flash memory module is not fully written, transmitting the first data from the first memory portion of the flash memory module to the host device.

7. The method of clause 3, wherein the first data includes a data page and the second data includes a plurality of data pages.

8. The method of clause 1, further comprising:
responding to the host device with a first signal after the transmission of the first data from the first buffer memory to the first memory portion of the flash memory module,
wherein the first signal indicates that the first memory portion is written with the first data.

9. The method of clause 1, wherein the first memory portion has a first operating mode and the second memory portion has a second operating mode, wherein the first operating mode is different from the second operating mode.

10. The method of clause 9, wherein the first memory portion comprises quad-level cells (QLC) or single-level cells and the second memory portion comprises QLC.

11. A flash memory controller for controlling a flash memory module having at least a first memory portion and a second memory portion, the flash memory controller comprising: a first communication interface configured to receive a first data from a host device;
a first buffer memory coupled with the first communication interface and configured to store the first data;
a second communication interface configured to transmit the first data to the first memory portion of the flash memory module from the first buffer memory;
wherein the first communication interface is further configured to transmit the first data from the first buffer memory to a host memory buffer of the host device; and
wherein the first data corresponds to at least a portion of a second data to be written to the second memory portion.

12. The flash memory controller of clause 11, further comprising:
an error correction unit coupled with the first communication interface, wherein the first data is transmitted through the first communication interface from the host memory buffer to the error correction unit, and wherein the error correction unit is configured to generate the second data in response to an error correction of the first data; and
a second buffer memory coupled with the error correction unit and the second communication interface, wherein the second buffer memory is configured to store the second data, wherein the second communication interface is further configured to transmit the second data from the second buffer memory to the second memory portion of the flash memory module.

13. The flash memory controller of clause 12, wherein the second data is generated based on error corrections of a plurality of first data received.

14. The flash memory controller of clause 12, wherein a transmission rate of the first data from the first buffer memory to the first memory portion is greater than that of the second data from the second buffer memory to the second memory portion.

15. The flash memory controller of clause 12, wherein the first communication interface is further configured to transmit an erase signal indicating an erasure of the first data to the host memory buffer after the second data is transmitted to the second memory portion.

16. The flash memory controller of clause 11, wherein upon receipt of a read request associated with the second data from the host device by the first communication interface:
the second data is transmitted from the second memory portion to the host device if the second memory portion of the flash memory module is fully written;
the first data is transmitted through the second communication interface from the first memory portion to the host device if the second memory portion of the flash memory module is not fully written.

17. The flash memory controller of clause 11, wherein the first data includes a data page and the second data includes a plurality of data pages.

18. The flash memory controller of clause 11, wherein a first signal is transmitted through the first communication interface to the host device after the transmission of the first data from the first buffer memory to the first memory portion of the flash memory module,
wherein the first signal indicates that the first memory portion is written with the first data.

19. The flash memory controller of clause 1, wherein the first memory portion has a first operating mode and the second memory portion has a second operating mode, wherein the first operating mode is different from the second operating mode.

20. The flash memory controller of clause 19, wherein the first memory portion comprises QLC or SLC and the second memory portion comprises QLC.

21. The flash memory controller of clause 11, wherein the first communication interface is a non-volatile memory express (NVMe) interface.

22. The flash memory controller of clause 12, wherein the second communication interface is a flash interface.

23. A data storage device, comprising:
a flash memory module having at least a first memory portion and a second memory portion;

a flash memory controller coupled with the flash memory module, the flash memory controller comprising:
a first communication interface configured to receive a first data from a host device,
a first buffer memory coupled with the first communication interface and configured to store the first data; and
a second communication interface configured to transmit the first data from the first buffer memory to the first memory portion of the flash memory module;
wherein the first communication interface is further configured to transmit the first data from the first buffer memory to a host memory buffer of the host device,
wherein the first data corresponds to at least a portion of a second data to be written to the second memory portion.

24. The data storage device of clause 23, wherein the flash memory controller further comprises:
an error correction unit coupled with the first communication interface, wherein the first data is transmitted through the first communication interface from the host memory buffer to the error correction unit, and wherein the error correction unit is configured to generate the second data in response to an error correction of the first data; and
a second buffer memory coupled with the error correction unit and the second communication interface, wherein the second buffer memory is configured to store the second data, wherein the second communication interface is further configured to transmit the second data from the second buffer memory to the second memory portion of the flash memory module.

25. The data storage device of clause 24, wherein the second data is generated based on error corrections of a plurality of first data received.

26. The data storage device of clause 24, wherein a transmission rate of the first data from the first buffer memory to the first memory portion is greater than that of the second data from the second buffer memory to the second memory portion.

27. The data storage device of clause 24, wherein the first communication interface is configured to transmit an erase signal indicating an erasure of the first data to the host memory buffer after the second data is transmitted to the second memory portion.

28. The data storage device of clause 23, wherein upon receipt of a read request associated with the second data from the host device by the first communication interface:
the second data is transmitted from the second memory portion to the host device if the second memory portion of the flash memory module is fully written;
the first data is transmitted from the first memory portion to the host device if the second memory portion of the flash memory module is not fully written.

29. The data storage device of clause 23, wherein the first data includes a data page and the second data includes a plurality of data pages.

30. The data storage device of clause 23, wherein a first signal is transmitted through the first communication interface to the host device after the transmission of the first data from the first buffer memory to the first memory portion of the flash memory module,
wherein the first signal indicates the first memory portion is written with the first data.

31. The data storage device of clause 23, wherein the first memory portion has a first operating mode and the second memory portion has a second operating mode, wherein the first operating mode is different from the second operating mode.

32. The data storage device of clause 31, wherein the first memory portion comprises QLC or SLC and the second memory portion comprises QLC.

33. The data storage device of clause 23, wherein the first communication interface is a non-volatile memory express (NVMe) interface.

34. The data storage device of clause 23, wherein the second communication interface is a flash interface.

35. A method for controlling a host device, comprising:
transmitting a first data to a data storage device through a first communication interface;
receiving the first data from the data storage device through the first communication interface; and storing the first data received in a host memory buffer,
wherein the first data corresponds to at least a portion of a second data to be written to the data storage device.

36. The method of clause 35, further comprising transmitting, to the host memory buffer, an erase signal indicating an erasure of the first data after the second data is successfully written to the data storage device.

37. The method of clause 35, further comprising, upon receipt of a request associated with the second data, accessing the first data in the host memory buffer if the second data is not fully written.

38. The method of clause 37, further comprising transmitting a request for the first data to the data storage device if the first data in the host memory buffer is not available.

It should be noted that the above disclosure is for illustrative purposes and should not be deemed as limiting the present disclosure. Those skilled in the art will readily observe that numerous modifications and alterations of the device and method may be made while retaining the teachings of the present disclosure. Accordingly, the above disclosure should be construed as limited only by the metes and bounds of the appended claims.

What is claimed is:
1. A method for controlling a memory storage device which comprises:
   a flash memory controller having a first buffer memory and a second buffer memory; and
   a flash memory module having at least a first memory portion and a second memory portion,
   the method comprising:
   receiving a first data from a host device;
   storing the first data in the first buffer memory;
   transmitting the first data to the first memory portion of the flash memory module from the first buffer memory;
   transmitting the first data to a host memory buffer (HMB) in the host device from the first buffer memory;
   wherein the first data corresponds to at least a portion of a second data to be written to the second memory portion;
   receiving a read request associated with the second data from the host device; and
   if the second memory portion of the flash memory module is fully written, transmitting the second data from the second memory portion to the host device;
   if the second memory portion of the flash memory module is not fully written, transmitting the first data from the first memory portion of the flash memory module to the host device.

2. The method of claim 1, further comprising:
receiving the first data from the HMB;
generating the second data based on an error correction of the first data;
storing the second data in the second buffer memory; and transmitting the second data to the second memory portion of the flash memory module from the second buffer memory.

3. The method of claim 2, wherein the second data is generated based on error corrections of a plurality of first data received.

4. The method of claim 2, wherein a transmission rate of the first data from the first buffer memory to the first memory portion is greater than that of the second data from the second buffer memory to the second memory portion.

5. The method of claim 2, further comprising:
erasing the first data from the host memory buffer after the second data is transmitted to the second memory portion.

6. The method of claim 1, wherein the first data includes a page of data and the second data includes a plurality of pages of data.

7. The method of claim 1, further comprising:
responding to the host device with a first signal after the transmission of the first data from the first buffer memory to the first memory portion of the flash memory module,
wherein the first signal indicates that the first memory portion is written with the first data.

8. The method of claim 1, wherein the first memory portion has a first operating mode and the second memory portion has a second operating mode, wherein the first operating mode is different from the second operating mode.

9. The method of claim 8, wherein the first memory portion comprises quad-level cells (QLC) or single-level cells and the second memory portion comprises QLC.

10. A flash memory controller for controlling a flash memory module having at least a first memory portion and a second memory portion, the flash memory controller comprising:
a first communication interface configured to receive a first data from a host device;
a first buffer memory coupled with the first communication interface and configured to store the first data;
a second communication interface configured to transmit the first data to the first memory portion of the flash memory module from the first buffer memory;
wherein the first communication interface is further configured to transmit the first data from the first buffer memory to a host memory buffer of the host device;
wherein the first data corresponds to at least a portion of a second data to be written to the second memory portion; and
wherein upon receipt of a read request associated with the second data from the host device by the first communication interface:
the second data is transmitted from the second memory portion to the host device if the second memory portion of the flash memory module is fully written;

the first data is transmitted through the second communication interface from the first memory portion to the host device if the second memory portion of the flash memory module is not fully written.

11. The flash memory controller of claim 10, further comprising:
an error correction unit coupled with the first communication interface wherein the first data is transmitted through the first communication interface from the host memory buffer to the error correction unit and wherein the error correction unit is configured to generate the second data in response to an error correction of the first data; and
a second buffer memory coupled with the error correction unit and the second communication interface, wherein the second buffer memory is configured to store the second data,
wherein the second communication interface is further configured to transmit the second data from the second buffer memory to the second memory portion of the flash memory module.

12. The flash memory controller of claim 11, wherein the second data is generated based on error corrections of a plurality of first data received.

13. The flash memory controller of claim 11, wherein a transmission rate of the first data from the first buffer memory to the first memory portion is greater than that of the second data from the second buffer memory to the second memory portion.

14. The flash memory controller of claim 11, wherein the first communication interface is further configured to transmit an erase signal indicating an erasure of the first data to the host memory buffer after the second data is transmitted to the second memory portion.

15. The flash memory controller of claim 10, wherein the first data includes a data page and the second data includes a plurality of data pages.

16. The flash memory controller of claim 10, wherein
a first signal is transmitted through the first communication interface to the host device after the transmission of the first data from the first buffer memory to the first memory portion of the flash memory module,
wherein the first signal indicates the first memory portion is written with the first data.

17. The flash memory controller of claim 10, wherein the first memory portion has a first operating mode and the second memory portion has a second operating mode, wherein the first operating mode is different from the second operating mode.

18. The flash memory controller of claim 17, wherein the first memory portion comprises QLC or SLC and the second memory portion comprises QLC.

* * * * *